(12) United States Patent
Rabbat et al.

(10) Patent No.: US 11,403,342 B2
(45) Date of Patent: Aug. 2, 2022

(54) INTENT-BASED SEARCH

(71) Applicant: Gfycat, Inc., Palo Alto, CA (US)

(72) Inventors: Richard Rabbat, Palo Alto, CA (US); Ernestine Fu, Northridge, CA (US)

(73) Assignee: Snap Inc., Santa Monica, CA (US)

( * ) Notice: Subject to any disclaimer, the term of this patent is extended or adjusted under 35 U.S.C. 154(b) by 135 days.

(21) Appl. No.: 16/438,227

(22) Filed: Jun. 11, 2019

(65) Prior Publication Data

US 2019/0377756 A1 Dec. 12, 2019

Related U.S. Application Data

(60) Provisional application No. 62/683,581, filed on Jun. 11, 2018.

(51) Int. Cl.
*G06F 16/735* (2019.01)
*G06F 16/738* (2019.01)
*G06F 16/78* (2019.01)
*G06F 16/787* (2019.01)

(52) U.S. Cl.
CPC .......... *G06F 16/735* (2019.01); *G06F 16/738* (2019.01); *G06F 16/787* (2019.01); *G06F 16/7867* (2019.01)

(58) Field of Classification Search
CPC .... G06F 16/375; G06F 16/738; G06F 16/787; G06F 16/7867
USPC ........................................................ 707/734
See application file for complete search history.

(56) References Cited

U.S. PATENT DOCUMENTS

| | | | | |
|---|---|---|---|---|
| 8,566,855 | B2* | 10/2013 | Wong | G06F 16/635 725/9 |
| 2012/0124028 | A1* | 5/2012 | Tullis | G06F 8/60 707/711 |
| 2012/0221548 | A1* | 8/2012 | Delli Santi | G06Q 30/0256 707/710 |
| 2014/0337335 | A1* | 11/2014 | Gordon | G06F 16/9535 707/736 |
| 2015/0278355 | A1* | 10/2015 | Hassanpour | G06F 16/951 707/706 |
| 2017/0193064 | A1* | 7/2017 | Judd | G06F 16/951 |
| 2017/0311035 | A1* | 10/2017 | Lewis | H04N 21/25891 |
| 2018/0144059 | A1* | 5/2018 | Saikia | G06F 16/957 |
| 2019/0129905 | A1* | 5/2019 | Goikhman | G06F 16/738 |
| 2019/0213213 | A1* | 7/2019 | Georges | G06F 16/5866 |

* cited by examiner

*Primary Examiner* — Shahid A Alam
(74) *Attorney, Agent, or Firm* — Schwegman Lundberg & Woessner, P.A.

(57) ABSTRACT

In a computer-implemented method for performing intent-based search of media files, a search query for searching media files of a library of media files is received from an electronic device. The search query includes a user-entered search term and additional search information related to an intent of a user. The library of media files is searched for media files according to the search query. Search results are returned to the electronic device, the search results including a listing of media files satisfying the user-entered search term and prioritized according to the additional search information related to the intent of the user.

16 Claims, 7 Drawing Sheets

INTENT-BASED SEARCH

RELATED APPLICATIONS

This application claims priority to and the benefit of U.S. Patent Provisional Patent Application 62/683,581, filed on Jun. 11, 2018, entitled "INTENT-BASED SEARCH," by Rabbat et al., and assigned to the assignee of the present application, which is incorporated herein by reference in its entirety.

BACKGROUND

Media files, such as audio and video files, are used in a variety of environments for conveying many types of information. For example, media files can be streamed or otherwise communicated over computer networks, allowing users to view and/or listen to the media content. As the volume of available media files available for streaming, sharing, etc. continues to grow, the importance of being able to search for desired media files grows as well.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

The following Description of Embodiments is merely provided by way of example and not of limitation. Furthermore, there is no intention to be bound by any expressed or implied theory presented in the preceding background or in the following detailed description.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical circuit. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "searching," "receiving," "returning," "extracting," "generating," "combining," "accessing," or the like, refer to the actions and processes of an electronic device such as: a processor, a memory, a computing system, a mobile electronic device, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example computer system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system upon which embodiments of the present invention may be implemented. A description of embodiments of an intent-based search system is then described. Example operations of intent-based search are then described.

In accordance with various embodiments, methods for intent-based search are provided. A search query for searching media files of a library of media files is received from an electronic device. In some embodiments, the media files are short form looping video files. The search query includes a user-entered search term and additional search information related to an intent of a user. The library of media files is searched for media files according to the search query. Search results are returned to the electronic device, the search results including a listing of media files satisfying the user-entered search term and prioritized according to the additional search information related to the intent of the user.

With the proliferation of media content available online, it is of increasing importance to provide users with relevant media responsive to search requests. For instance, in conventional searching of libraries of media files, users may submit particular search terms as a search query, and a search of a library of media files will return a listing of media content items related to the search terms. However, the returned listing is only based on the search terms, and may provide content outside the scope of the intent of the user, as the user is typically limited to the content explicitly provided in the search query.

Intent-based search, in accordance with the described embodiments, enhances search of a library of media files be inferring one or more intentions of a user search to provide improved search results. By inferring additional information about the user, the search query can be honed such that search results of greater relevancy to the user are returned. For example, a language setting of a user or a geographical location of a user can be used to provide more relevant search results. Moreover, a user's prior search history can be used to weight certain search terms of a new search query, returning search results more tailored to the user.

In one embodiment, searchable information is captured at the creation and/or publication of the media file. When a new media file is created and added to the library of media files, various pieces of information can also be captured and saved. For example, a language of a creator or publisher and/or a geographic location of the creator or publisher can be ascertained at creation and save (e.g., as metadata) along with the media file. This information can be accessed by a search engine in order to enhance the search results and make them more relevant to a searcher.

For instance, a user may enter a search for "surfers." In a conventional search, media files tagged with the term "surfers" will be returned. However, these search terms may will likely return search results that include media files that are less relevant to the user. For example, a user is geographically located in California searching for "surfers" is more likely to desire media content of surfers in California than media content of surfers in Indonesia. Embodiments of the present invention, by incorporating information related to the intent of the user, return search results that consider the implicit intent of the user. Continuing with the example, the described embodiments can consider the geographic location of the user and the geographic location of the media content in returning search results that are directed to content created and/or published in the user's geographic location.

In accordance with various embodiments, the additional search information related to the intent of the user includes, without limitation: a geographic location of the electronic device from which the search request was received, a language setting associated with the electronic device from which the search request was received, and a prior search history of a user of the electronic device from which the request was received. By using one or more of the described additional search information, the intent of the user can be implied, improving the search results by ranking the results in consideration of the additional search information.

Embodiments described herein pertain to searching a library of media files such as looping video files or short form looping video files. In one embodiment, the media files include Graphics Interchange Format (GIF) files. While embodiments described herein pertain to GIF files, it should be appreciated that other types of prerecorded media files, such as other types of video files, can be used herein. Moreover, it should be appreciated that any type of video file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that the prerecorded media file can be looped (e.g., via a HTML 5 video element or Flash video element) to automatically repeat. In some embodiments, the looping video files are short form looping video files (e.g., less than 60 seconds in length). In some embodiments, looping video files do not include sound. In some embodiments, the media files include emojis.

As presented above, providing relevant search results of media content is important for facilitating the use of digital content. Providing search results that accurately capture the intent of the user by considering information in addition to the user-submitted search terms improves the performance of digital content search by providing more representative results. Hence, the embodiments described herein greatly extend beyond conventional methods of searching for media content items such as looping video files or short form looping video files. Moreover, embodiments of the present invention amount to significantly more than merely using a computer to perform a search for media content. Instead, embodiments of the present invention specifically recite a novel process, rooted in computer technology, utilizing a user-entered search term and additional search information related to the intent of the user to provide relevant search results to the user, thereby improving the user experience.

Example Computer System

Figure 1:
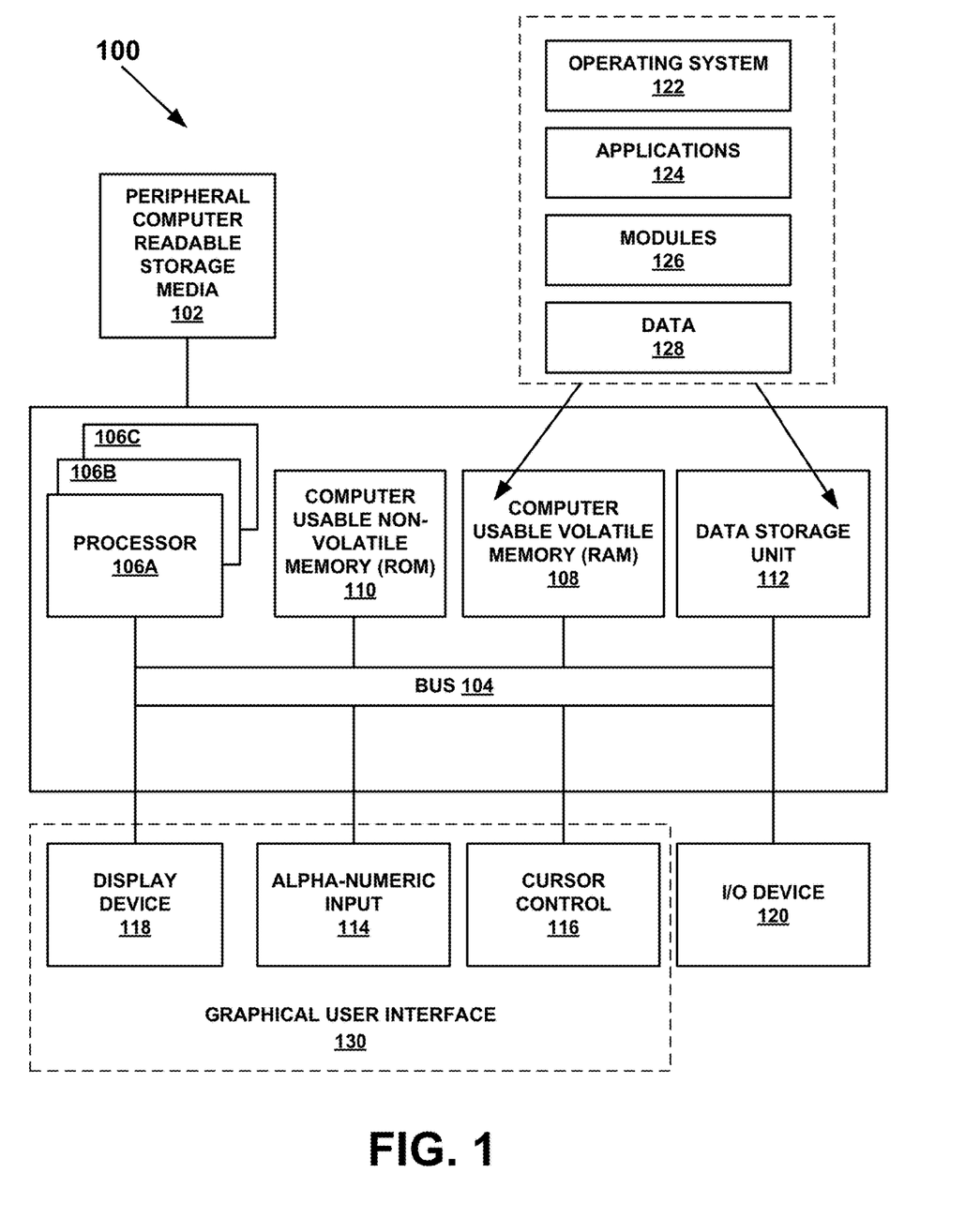
FIG. 1 illustrates an example computer system upon which embodiments described herein may be implemented.

Turning now to the figures, FIG. 1 is a block diagram of an example computer system 100 upon which embodiments of the present invention can be implemented. FIG. 1 illustrates one example of a type of computer system 100 (e.g., a computer system) that can be used in accordance with or to implement various embodiments which are discussed herein.

It is appreciated that computer system 100 of FIG. 1 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand alone computer systems, media centers, handheld computer systems, multi-media devices, and the like. In some embodiments, computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 100 of FIG. 1 includes an address/data bus 104 for communicating information, and a processor 106A coupled with bus 104 for processing information and instructions. As depicted in FIG. 1, computer system 100 is also well suited to a multi-processor environment in which a plurality of processors 106A, 106B, and 106C are present. Conversely, computer system 100 is also well suited to having a single processor such as, for example, processor 106A. Processors 106A, 106B, and 106C may be any of various types of microprocessors. Computer system 100 also includes data storage features such as a computer usable volatile memory 108, e.g., random access memory (RAM), coupled with bus 104 for storing information and instructions for processors 106A, 106B, and 106C. Computer system 100 also includes computer usable non-volatile memory 110, e.g., read only memory (ROM), coupled with bus 104 for storing static information and instructions for processors 106A, 106B, and 106C. Also present in computer system 100 is a data storage unit 112 (e.g., a magnetic or optical disc and disc drive) coupled with bus 104 for storing information and instructions. Computer system 100 also includes an alphanumeric input device 114 including alphanumeric and function keys coupled with bus 104 for communicating information and command selections to processor 106A or processors 106A, 1066, and 106C. Computer system 100 also includes a cursor control device 116 coupled with bus 104 for communicating user input information and command selections to processor 106A or processors 106A, 106B, and 106C. In one embodiment, computer system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. Computer system 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with computer system 100 through graphical representations presented on display device 118 by interacting with alphanumeric input device 114 and/or cursor control device 116.

Computer system 100 also includes an I/O device 120 for coupling computer system 100 with external entities. For example, in one embodiment, I/O device 120 is a modem for enabling wired or wireless communications between computer system 100 and an external network such as, but not limited to, the Internet. In one embodiment, I/O device 120 includes a transmitter. Computer system 100 may communicate with a network by transmitting data via I/O device 120.

Referring still to FIG. 1, various other components are depicted for computer system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Example Network and System for Performing Intent-Based Search of Media Files

Figure 2:
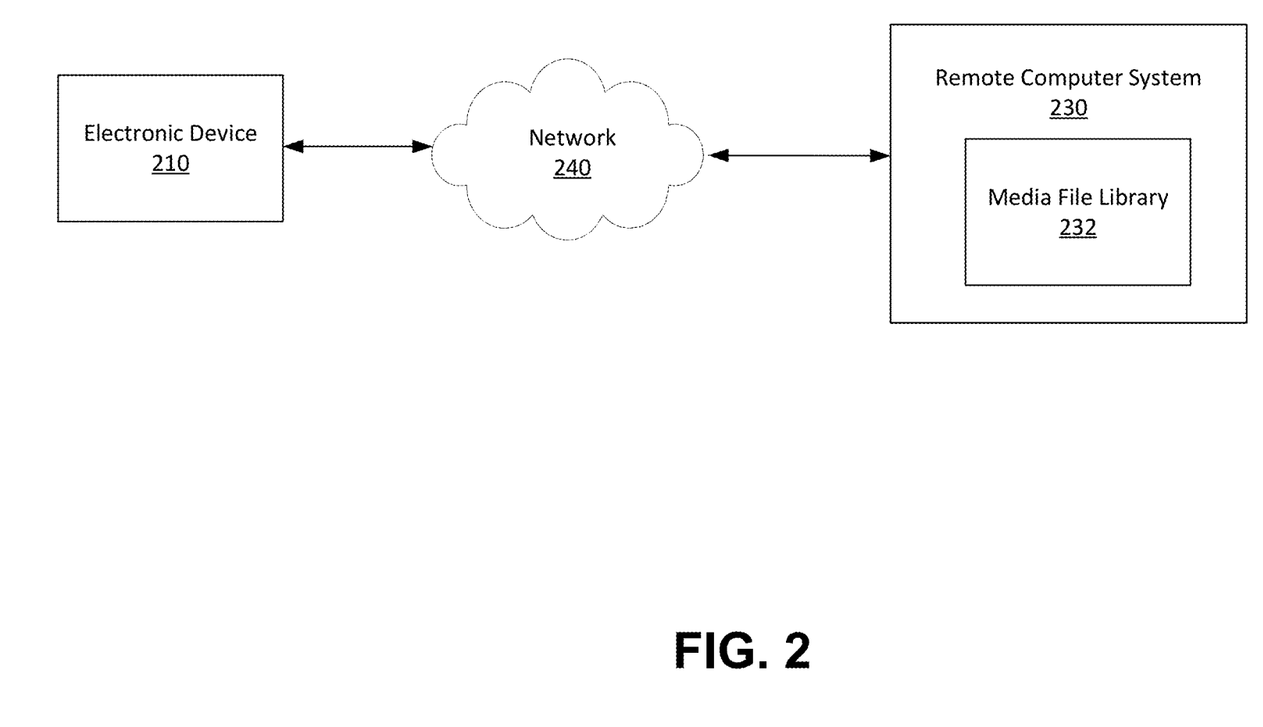
FIG. 2 illustrates an example network upon which embodiments described herein may be implemented.

FIG. 2 illustrates an example communication network 240 upon which embodiments described herein may be implemented. FIG. 2 illustrates electronic device 210 and remote computer system 230, both of which are communicatively coupled via network 240. It should be appreciated that electronic device 210 and remote computer system 230, may be implemented as a computer system 100, and/or include any combination of the components of computer system 100 in which electronic device 210 and remote computer system 230 are able to communicate with each other. In some embodiments, electronic device 210 is a mobile electronic device (e.g., a smart phone) including messaging applications for communicating electronic messages via a graphical user interface.

In accordance with various embodiments, electronic device 210 is capable of transmitting a search query to remote computer system 230 for performing an intent-based search of media files of media file library 232. Electronic device 210 may be associated with a particular user. In some embodiments, electronic device 210 is capable of storing a search history (e.g., in computer usable non-volatile memory 110).

In some embodiments, electronic device 210 is configured to determine a location of electronic device 210. For example, electronic device 210 may include a location sensor for determining a location of electronic device 210, such as a navigation satellite system sensor such as a Global Navigation Satellite System (GNSS) receiver (e.g., Global Positioning System (GPS) sensor) and/or other components configured to determine the location of electronic device 210 from external radio signals. In some embodiments, electronic device 210 is configured to determine its location based on a location of a known network access point (e.g., cell tower or wireless access point). It is noted that the functionality of location sensor may be implemented by a processor (e.g., processor 106A).

In one embodiment, remote computer system 230 is a server including a library of media file library 232. A media file can be any type of file that can be rendered on electronic device 210 (e.g., an audio file or a video file). It should be appreciated that any type of media file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, MPEG-1 or MPEG-2 Audio Layer III (MP3), etc. It should be appreciated that the prerecorded media file can be looped (e.g., via a HTML 5 video element or Flash video element) to automatically repeat.

In some embodiments, electronic device 210 is capable of accessing media file library 232 (e.g., via a graphical user interface). A user may navigate through media file library 232 to search and select a media file, e.g., for transmission to a recipient or for playback. A user may enter text search terms (e.g., via a graphical user interface) to search and select a media file.

In some embodiments, access to the library of media files is accessible via an application executing on electronic device 210. It should be appreciated that an electronic device may include media file library 232, or that media file library 232 may be distributed across both an electronic device and remote computer system 230. For example, a subset of media files of media file library 232 may be maintained within memory of electronic device 210 (e.g., frequently used media files) for access that does not require communication over network 240.

In various embodiments, media files are associated with at least one category (e.g., a word, sentence, or phrase) that identifies the subject matter of the media files. Categories are used for sorting media files within the media file library 232, allowing a user to locate or select a particular media file according to their desired message. It should be appreciated that a category associated with a media file can be assigned manually or automatically, and are generally indicative of the depiction presented in the media file (e.g., are searchable). In some embodiments, a category (or categories) associated with a media file may be saved as metadata of the media file. In some embodiments, a category (or categories) associated with a media file may be saved within media file library 232.

Figure 3:
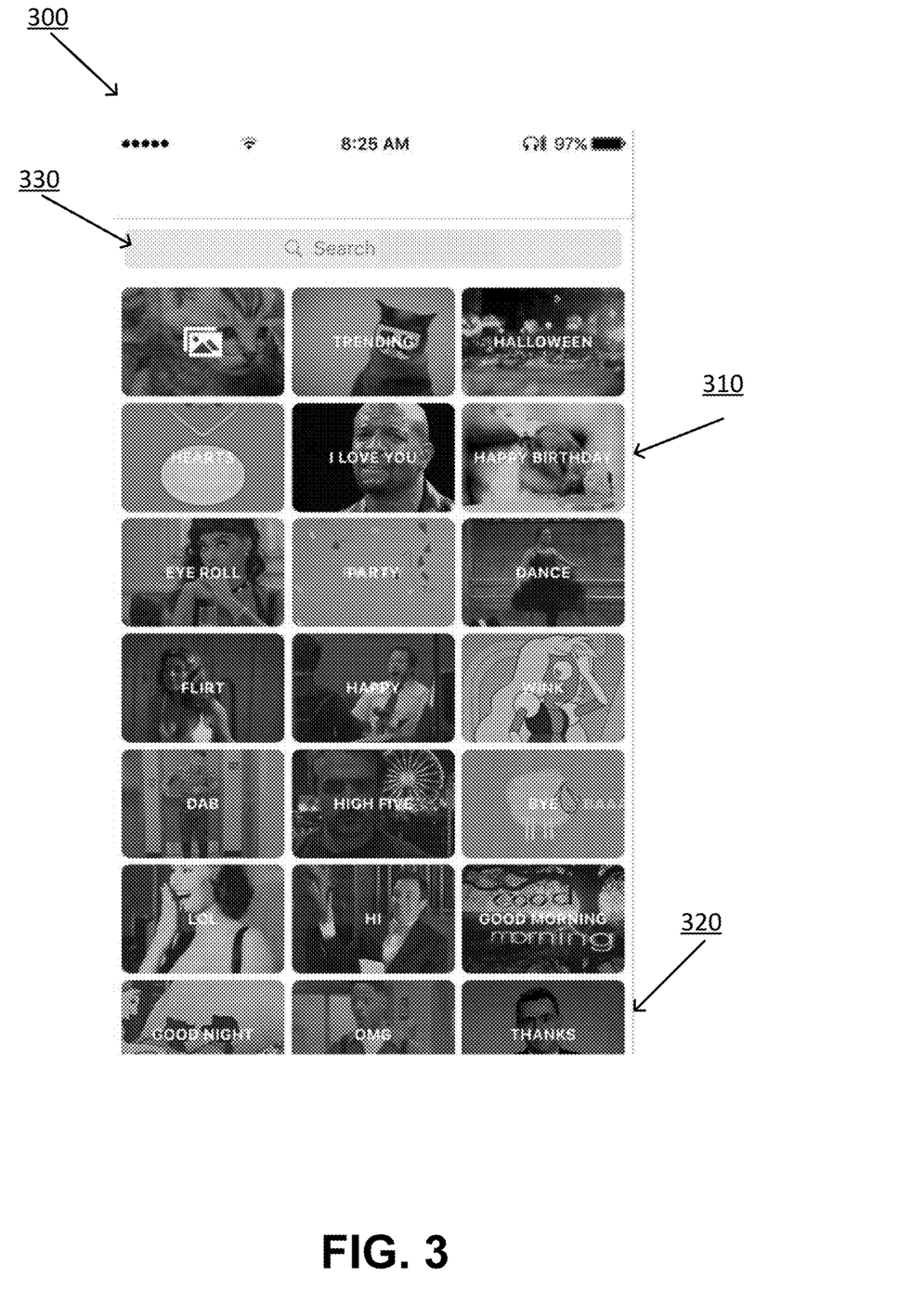
FIG. 3 illustrates an example screen shot of a graphical user interface for searching a media file library, according to one embodiment.

FIG. 3 illustrates an example screen shot of a graphical user interface 300 for accessing a media file library, according to one embodiment. Graphical user interface 300 includes a plurality of selectable categories, of which category 310 ("Happy Birthday") and category 320 ("Thanks") are two examples. By selecting a category (e.g., category 310 or 320), graphical user interface 300 presents media files for the selected category. For example, selecting category 310 causes graphical user interface 300 to display a new screen of media files for the category "Happy Birthday." Graphical user interface 300 also includes search field 330 for receiving text search terms for media files.

It should be appreciated that, in some embodiments, a user selection of a category 310 may effectively operate as entering the name of the selected category 310 into search field 330.

Figure 4:
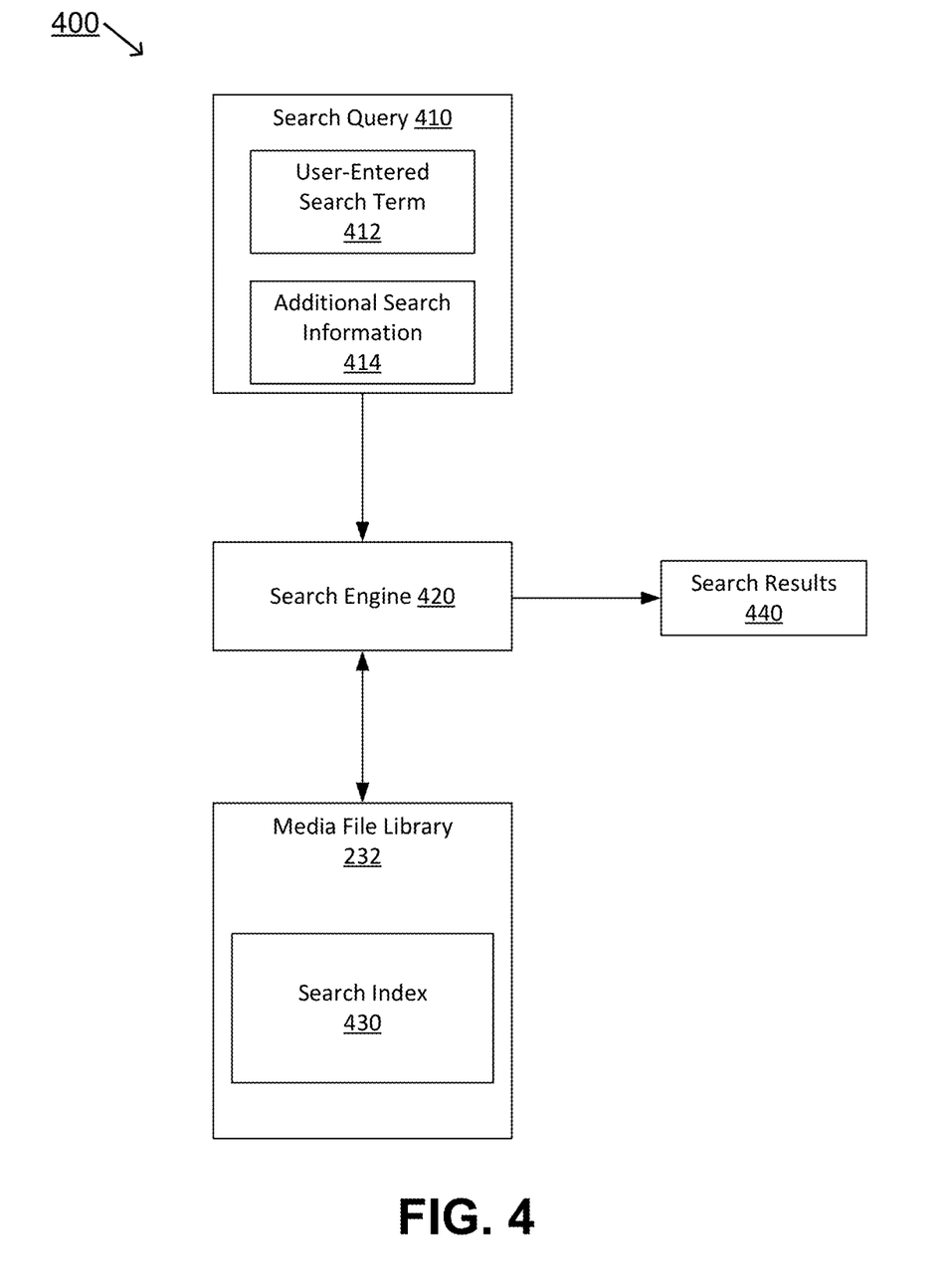
FIG. 4 illustrates a system for intent-based search, in accordance with various embodiments.

FIG. 4 illustrates an example system 400 for intent-based search, in accordance with various embodiments. A search query 410 is received at search engine 420. In some embodiments, search query 410 is received from an electronic device (e.g., electronic device 210). It should be appreciated that the search engine 420 can be located in the electronic device, a remote computer system (e.g., remote computer system 230), or components of search engine 420 can be distributed across both the electronic device at which search query 410 was generated and a remote computer system.

Search query 410 includes a user-entered search term 412 and additional search information 414. User-entered search term 412 includes one or more words or phrases (e.g., a character string), emojis, or other text submission (e.g., entered at search field 330) or a selection of a category (e.g., category 310). Additional search information 414 is information that is related to an intent of a user. In some embodiments, additional search information 414 includes information about the device at which user-entered search term 412 is received and/or the application at which user-entered search term 412 is received. For example, additional search information 414 may include a location of the device or a language setting of the device or application operating on the device at which user-entered search term 412 is received. In some embodiments, additional search information 414 includes at least a portion of the search history of a user of the application or device. It should be appreciated that additional search information 414 can include any information related to an electronic device, applications executing on the electronic device, or a user operating the electronic device.

Search engine 420 is operable to search media file library 232 for media files according to search query 410. Search engine 420 performs a search of media file library 232 according to user-entered search term 412. In some embodiments, search engine 420 extracts one or more keywords from user-entered search term 412. Search engine 420 performs a search of media file library 232 according to the one or more keywords.

In some embodiments, media file library 232 includes metadata for the media files, the metadata identifying sourcing information of the respective media files. In some embodiment, the sourcing information includes a language setting associated with a device and/or application from which a particular media file is uploaded to the library of media files. In some embodiments, the sourcing information includes a geographical location of a device from which a particular media file is uploaded to the library of media files. It should be appreciated that the sourcing information can include any information related to the creation and original source of a media file, including user added tags, geotags, etc.

In some embodiments, the search engine 420 accesses at least one search index 430 for the library of media file library 232, wherein the at least one search index 430 includes entries pertaining to the sourcing information (e.g., the metadata) of the media files of the library of media files. Search engine 420 searches user-entered search term 412 and/or additional search information 414 in search index 430. In one embodiment, search engine 420 searches additional search information 414 against the sourcing information of the media files.

In some embodiments, search engine 420 searches media file library 232 by generating a plurality of search queries based on the search query. The plurality of search queries includes at least one user entered search term query based on user-entered search term 412 and at least one user intent query based on additional search information 414 related to the intent of the user. Search engine 420 searches media file library 232 according to the plurality of search queries. Search engine 420 combines results of the plurality of search queries to generate the search results 440.

After completing a search, search engine 420 returns search results to the electronic device and/or application from which search query 410 was received. Search results 440 include a listing of media files satisfying user-entered search term 412 and prioritized according to additional search information 414 related to the intent of the user. In some embodiments, the media files include looping video files or short form looping video files. In some embodiments, the media files include emojis.

Figure 5A:
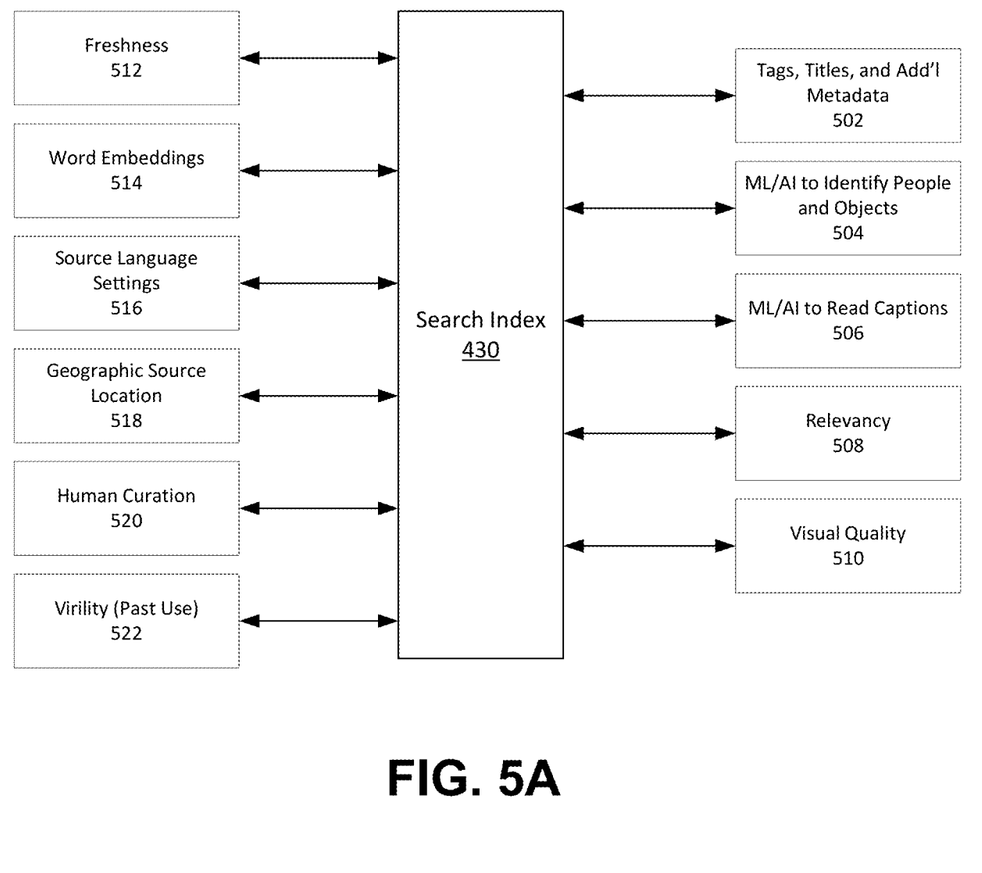
FIGS. 5A and 5B illustrate block diagrams of an example search application programming interface (API), according to various embodiments.
Figure 5B:
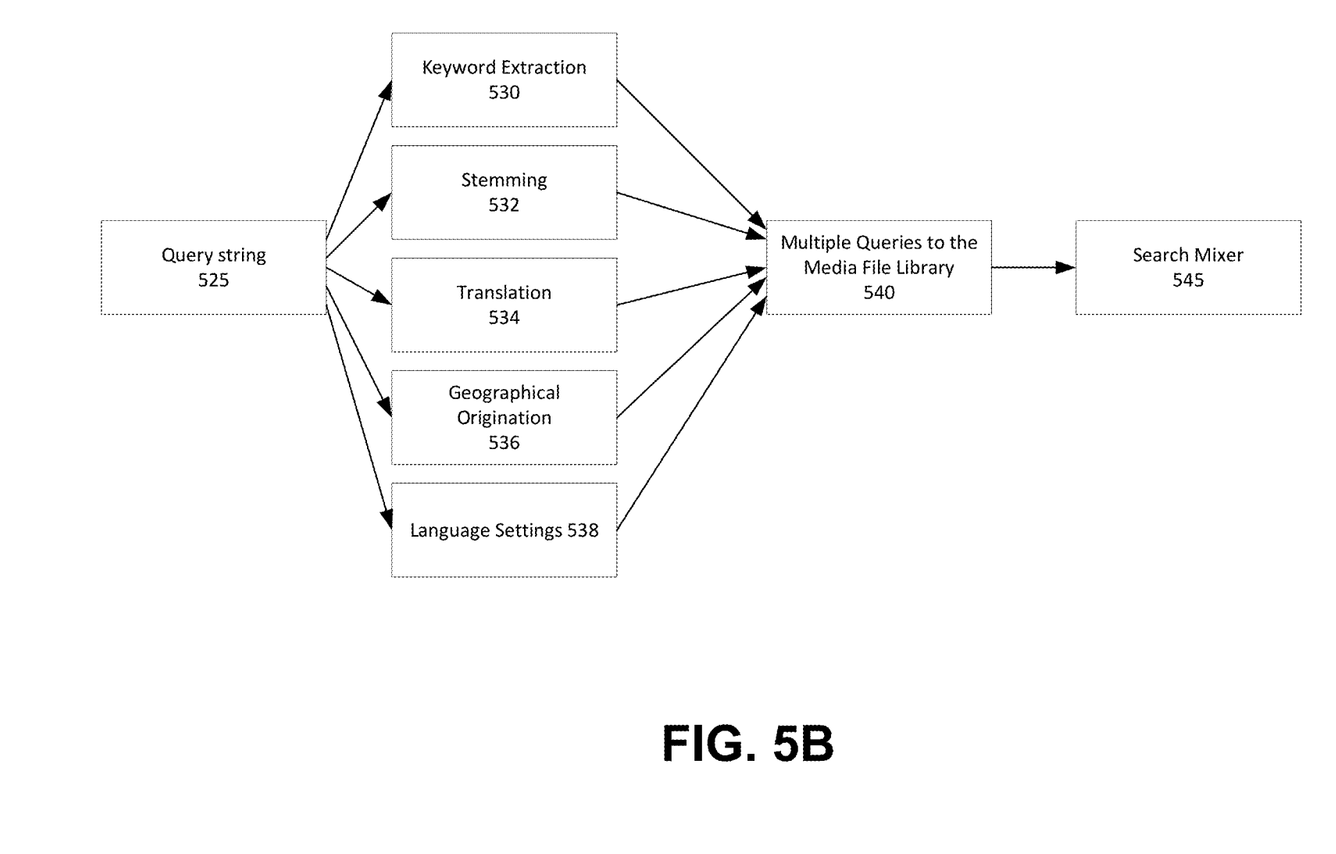

FIGS. 5A and 5B illustrate block diagrams of an example search application programming interface (API) in accordance with the described embodiments. The search engine is capable of using multiple inputs to determine the best search results, as illustrated.

With reference to FIG. 5A, it should be appreciated that media files can be indexed for searching at search index 430. Search indexing is based on a number of signals that can be used to rank content. The following are examples of search indexing that can be implemented, in accordance with various embodiments:

1. Tags, titles and additional metadata 502: search uses a number of text inputs to rank the content. The media file library 232 uses user created tags and titles for the media files (e.g., GIFs) that describe and qualify the content. Additionally, the media file library 232 can use a number of additional metadata. For example, if content is shared on a social network or site, the media file library can glean the title of the post, or the tweet to use in making the content more discoverable (for example, if one posts a Tweet on Twitter, the content of the tweet is additional metadata that the media file library uses.
2. Machine learning (ML)/artificial intelligence (AI) to identify people/objects/animals 504: the media file library 232 uses ML/AI to identify people (for example a certain celebrity), animals (e.g. poodle) and living (fir tree) and inanimate objects (limousine). This information is also used for the indexing of the content.
3. ML/AI to read captions in the media files 506: the media file library uses ML/AI to read the captions from the media files and use those captions to index the content (e.g., "I love you" caption).
4. Relevancy 508 as measured by usage for the particular search query.
5. Visual quality 510 as measured by usage and engagement (sharing): content that is shown as a search result can be appealing visually, which leads users to share that content. The media file library uses 232 that data in its search ranking.
6. Freshness 512: newness of the content is also used in the search ranking. Depending on the query, freshness may be a strong signal (e.g., media files of a sports team winning a recent championship would be newer, whereas a media file of a former U.S. President would be older content).
7. Word embeddings 514: allows search to understand a query for similar or related words. For example, media file library may associate the term "Warriors" as related to "basketball". In another example, in some cases, even though there is no immediate match to a query term, there may be a match to a related term (e.g., a search for the query term "indubitable" may not include an immediate match, while the related term "certain" may have a match).
8. Language settings 516: when a media file (video or image) content is uploaded from device with a certain language setting, the language setting itself is a good signal used in ranking. When serving search results, it can be used in the ranking of the content. For example, when a user with device language setting of French in the USA that uploads content to the media file library, that content's language settings is a signal that is used later when serving search results to another person whose device's language settings are also set to French and conversely when the settings are set to some other language.

9. Geography 518: when a media file (video or image) content is uploaded from device from a certain geographical location the geographical location itself is a good signal used in ranking. When serving search results, it can be used in the ranking of the content. For example, when a user with that uploads content to the media file library from California, that content's geographical location is a signal that is used later when serving search results to another person who is in California and conversely to another person who is not.

10. Human curation 520: visually interesting content is also subjective and the media file library uses staff to prefer content that has diversity, multiple themes, from different vertical niches (e.g., gaming, basketball, or celebrity, etc.) but also colors, quality of the media file, length, and other elements that make the media file of interest.

11. Virility 522: frequency of use of the content over time is also used in the search ranking. Depending on the query, virility may be a strong signal (frequently used footage of an historic event would be ranked higher than seldom used footage of the same event).

In some embodiments, the search is capable of performing query intent pre-processing, so as to expedite the search, as illustrated in FIG. 5B. The following are examples of query pre-processing of a query string 525 that can be implemented:

Keyword extraction 530: For example, the word "love" in the phrase "I love you". When a user passes a string of words in the search field, the relevant words can be extracted and prioritized against the search index. For example, "love" is more important than "I" and "you".

Stemming 532: allows for the identification of a stem from a list of conjugated words, pluralized words, etc. and give results for "eating out" that are related to "eat", etc. For example, "love" is the stem for "loving", "lovingly", "loved", "lover", "lovely", and "love".

Translation 534: a translation of the search terms into a different language.

Geographical origination of query 536: the geographic location of the device and/or application from the which the search query is received.

Language settings of device issuing query 538: the language settings of the device and/or application from the which the search query is received.

In some embodiments, multiple queries are run against the media file library based on the preprocessing, at block 540. At search mixer 545, the results are mixed (e.g., weighed, ranked, etc.)

Embodiments described herein also provide improvements and enhancements to the serving of media files. In some embodiments, the intent-based search as described herein is implemented as an anticipatory search.

In some embodiments, a locally relevant trending queue is provided. Trending content is delivered based on geographic location and/or language: a trending queue for somebody in France could be different (e.g., the French president making a funny face) than the trending queue in the United Kingdom (e.g., a GIF of a football match) or in the United States (e.g., the birthday of a famous musician), etc. Serving locally relevant content and content that has been reviewed by computer vision to not contain captions will result in more engagement.

In some embodiments, a personalized trending queue is provided. For example, a user that likes "aww" or "LOL" will see more trending content of that nature versus a person who likes sports that will see more sports related content versus a user that likes KPOP that will enjoy that content. In some embodiments, the personalized trending queue utilizes anonymized data.

Example Methods of Operation of Intent-Based Search

Figure 6:
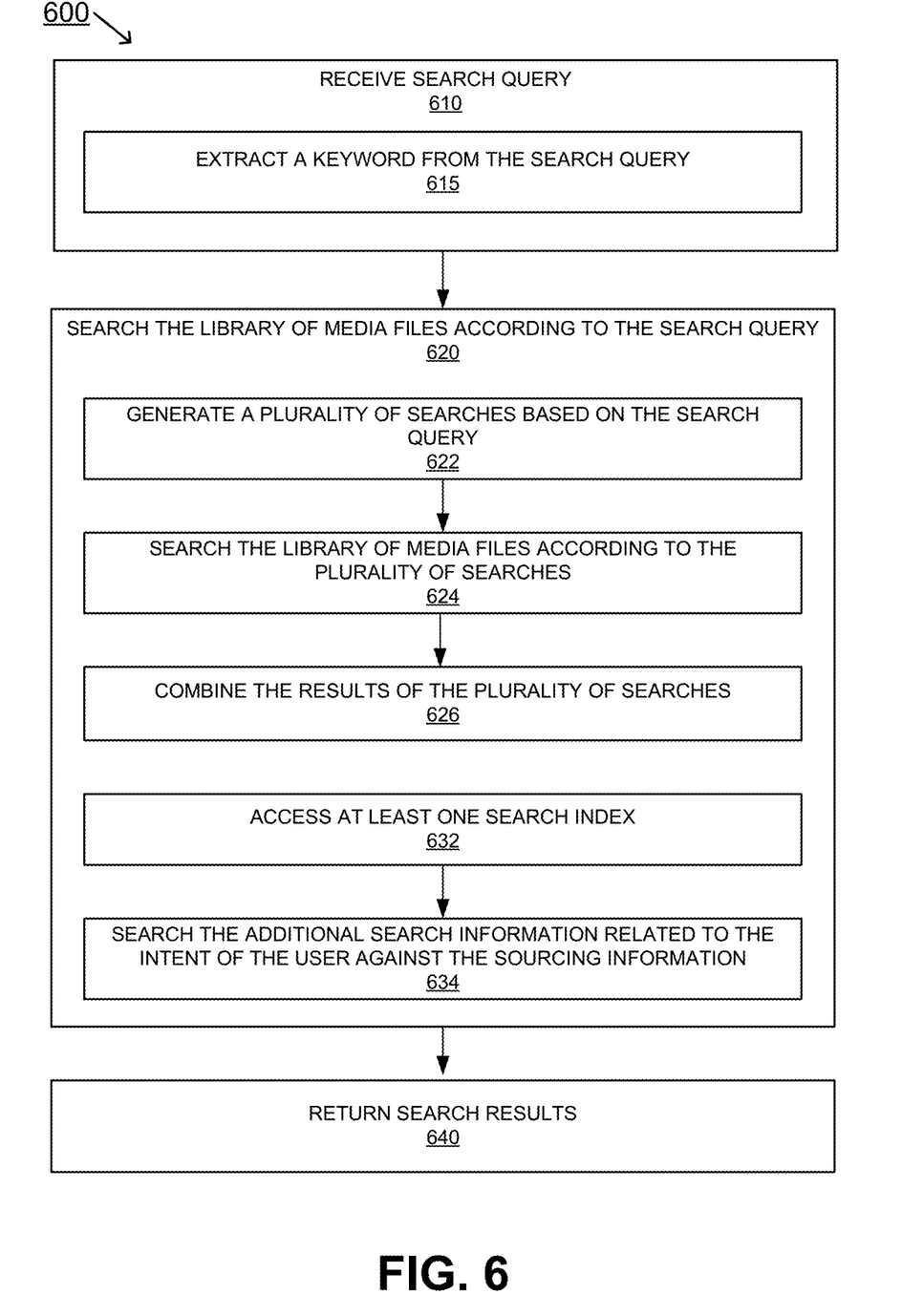
FIG. 6 illustrates a flow diagram of an example method for performing intent-based search of media files, according to various embodiments.

FIG. 6 illustrates a flow diagram 600 of an example method for performing intent-based search of media files, according to various embodiments. Procedures of this method may be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 600 includes some procedures that, in various embodiments, are carried out by one or more processors under the control of computer-readable and computer-executable instructions that are stored on non-transitory computer-readable storage media. It is further appreciated that one or more procedures described in flow diagram 600 may be implemented in hardware, or a combination of hardware with firmware and/or software.

At procedure 610 of flow diagram 600, a search query for searching media files of a library of media files is received from an electronic device. The search query includes a user-entered search term and additional search information related to an intent of a user. In one embodiment, as shown at procedure 615 at least one keyword is extracted from the user-entered search term.

In one embodiment, the additional search information related to the intent of the user comprises a geographic location of the electronic device. In one embodiment, the additional search information related to the intent of the user comprises a language setting associated with the electronic device. In one embodiment, the additional search information related to the intent of the user comprises a prior search history of a user of the electronic device.

At procedure 620, the library of media files is searched for media files according to the search query. In one embodiment, the library of media files is searched according to the at least one keyword. In one embodiment, the library of media files includes metadata for the media files of the library of media files, the metadata identifying sourcing information of the media files of the library of media files. In one embodiment, the sourcing information of a particular media file includes a language setting associated with a device from which a particular media file is uploaded to the library of media files. In one embodiment, the sourcing information of a publisher of a particular media file includes a geographical location of a device from which a particular media file is uploaded to the library of media files.

In one embodiment, at procedure 622, a plurality of search queries are generated based on the search query, the plurality of search queries including at least one user entered search term query based on the user-entered search term and at least one user intent query based on the additional search information related to the intent of the user. At procedure 624, the library of media files is searched according to the plurality of search queries. At procedure 626, the results of the plurality of search queries are combined to generate the search results.

In one embodiment, as shown at procedure 632, at least one search index for the library of media files is accessed, wherein the at least one search index includes entries pertaining to the sourcing information of the media files of the library of media files. At procedure 634, the additional search information related to the intent of the user is searched against the sourcing information of the media files.

At procedure 640, search results are returned to the electronic device, the search results including a listing of media files satisfying the user-entered search term and prioritized according to the additional search information related to the intent of the user.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for performing intent-based search of media files, the method comprising:
    determining geographic locations of uploading devices from which media files are uploaded for inclusion in a library of media files;
    generating a search index of the media files uploaded for inclusion in the library of media files, the search index including the geographic locations of the uploading devices;
    receiving a search query for searching media files of the library of media files, the search query being transmitted over a network from an accessing electronic device, wherein the search query comprises a user-entered search term and additional search information related to an intent of a user, the additional search information related to the intent of the user comprising a geographic location of the accessing electronic device;
    searching the library of media files for media files according to the search query including by searching the geographic location of the accessing electronic device against the geographic locations of the uploading devices in the search index; and
    returning search results to the accessing electronic device over the network, the search results comprising a listing of media files satisfying the user-entered search term and ranked according to the geographic location of the accessing electronic device.

2. The method of claim 1, wherein the additional search information further comprises information related to the accessing electronic device, applications executing on the accessing electronic device, or a user operating the accessing electronic device.

3. The method of claim 1, wherein the searching the library of media files for media files according to the search query comprises:
    generating a plurality of search queries based on the search query, the plurality of search queries comprising at least one user entered search term query based on the user-entered search term and at least one user intent query based on the additional search information related to the intent of the user;
    searching the library of media files according to the plurality of search queries; and
    combining results of the plurality of search queries to generate the search results.

4. The method of claim 1, wherein the additional search information related to the intent of the user further comprises a natural language setting associated with the accessing electronic device.

5. The method of claim 1, wherein the additional search information related to the intent of the user further comprises a prior search history of a user of the accessing electronic device.

6. The method of claim 1, wherein the library of media files further comprises metadata for the media files of the library of media files, the metadata identifying sourcing information of the media files of the library of media files.

7. The method of claim 6, wherein the sourcing information of a particular media file further comprises a language setting associated with a device from which a particular media file is uploaded to the library of media files.

8. The method of claim 6, wherein the searching the library of media files for media files according to the search query comprises:
    accessing at least one search index for the library of media files, wherein the at least one search index comprises entries pertaining to the sourcing information of the media files of the library of media files; and
    searching the additional search information related to the intent of the user against the sourcing information of the media files.

9. A non-transitory computer readable storage medium having computer readable program code stored thereon for causing a computer system to perform a method for performing intent-based search of media files, the method comprising:
    determining geographic locations of uploading devices from which media files are uploaded for inclusion in a library of media files;
    generating a search index of the media files uploaded for inclusion in the library of media files, the search index including the geographic locations of the uploading devices;
    receiving a search query for searching media files of a library of media files, the search query being transmitted over a network from an accessing electronic device, wherein the search query comprises a user-entered search term and additional search information related to an intent of a user, the additional search information related to the intent of the user comprising a geographic location of the accessing electronic device;

searching the library of media files for media files according to the search query, including by searching the geographic location of the accessing electronic device against the geographic locations of the uploading devices in the search index; and returning search results to the accessing electronic device over the network, the search results comprising a listing of media files satisfying the user-entered search term and ranked according to the geographic location of the accessing electronic device.

10. The non-transitory computer readable storage medium of claim 9, herein the additional search information further comprises information related to the accessing electronic device, applications executing on the accessing electronic device, or a user operating the accessing electronic device.

11. The non-transitory computer readable storage medium of claim 9, wherein the searching the library video media files for media files according to the search query comprises:

generating a plurality of search queries based on the search query, the plurality of search queries comprising at least one user entered search term query based on the user-entered search term and at least one user intent query based on the additional search information related to the intent of the user;

searching the library of media files according to the plurality of search queries; and combining results of the plurality of search queries to generate the search results.

12. The non-transitory computer readable storage medium of claim 9, wherein the additional search information related to the intent of the user further comprises a natural language setting associated with the accessing electronic device.

13. The non-transitory computer readable storage medium of claim 9, wherein the additional search information related to the intent of the user further comprises a prior search history of a user of the accessing electronic device.

14. The non-transitory computer readable storage medium of claim 9, wherein the library of media files comprises metadata for the media files of the library of files, the metadata identifying sourcing information of the media files of the library of files.

15. The non-transitory computer readable storage medium of claim 14, wherein the sourcing information of a particular media file further comprises a language setting associated with a device from which a particular media file is uploaded to the library of media files.

16. A computer system comprising:

a data storage unit; and a processor coupled with the data storage unit, the processor configured to:

determine geographic locations of uploading devices from which media files are uploaded for inclusion in a library of media files;

determine language settings of uploading devices from which media files are uploaded for inclusion in a library of media files;

generate a search index of the media files uploaded for inclusion in the library of media files, the search index including the geographic locations of and the language settings associated with the uploading devices;

receive a search query for searching media files of a library of media files, the search query being transmitted over a network from an accessing electronic device, wherein the search query comprises a user-entered search term and additional search information related to an intent of a user, wherein the additional search information related to the intent of the user comprises a geographic location of the accessing electronic device and a language setting associated with the accessing electronic device;

search the library of media files for media files according to the search query including by searching the geographic location and the language setting of the accessing electronic device against the geographic locations and language settings of the uploading devices in the search index; and return search results to the accessing electronic device over the network, the search results comprising a listing of media files satisfying the user-entered search term and ranked according to the geographic location of the accessing electronic device.

* * * * *

UNITED STATES PATENT AND TRADEMARK OFFICE
CERTIFICATE OF CORRECTION

Page 1 of 1

PATENT NO. : 11,403,342 B2
APPLICATION NO. : 16/438227
DATED : August 2, 2022
INVENTOR(S) : Rabbat et al.

It is certified that error appears in the above-identified patent and that said Letters Patent is hereby corrected as shown below:

On the Title Page

In item (71), in "Applicant", in Column 1, Line 1, delete "Gfycat, Inc., Palo Alto," and insert --Snap Inc., Santa Monica,-- therefor In the Claims In Column 15, Line 17, in Claim 10, delete "herein" and insert --wherein-- therefor In Column 15, Line 22, in Claim 11, delete "video" and insert --of-- therefor Signed and Sealed this
Sixth Day of June, 2023

Katherine Kelly Vidal
*Director of the United States Patent and Trademark Office*